July 13, 1943.  M. R. HUTCHISON, JR  2,324,086

FILM SPOOL HOLDER

Filed July 19, 1941

Miller R. Hutchison, Jr.
INVENTOR

BY
ATTORNEYS

Patented July 13, 1943

2,324,086

UNITED STATES PATENT OFFICE 2,324,086

FILM SPOOL HOLDER

Miller R. Hutchison, Jr., Rochester, N. Y., assignor to Eastman Kodak Company, Rochester, N. Y., a corporation of New Jersey Application July 19, 1941, Serial No. 403,176

6 Claims. (Cl. 242—71)

The present invention relates to photographic cameras, and more particularly to roll holders therefor.

One object of the invention is the provision of a roll holder construction which serves to not only support the film spools in position in the camera, but also effectively prevents clockspringing of the sensitized film and its protective backing paper relative to the film spool during the film loading and threading operations.

A further object of the invention is the provision of a roll holder construction which will insure a tightly wound take-up or exposed roll.

Another object of the invention is the provision of a roll holder construction which is so arranged as to automatically and effectively tuck in the marginal edges of the trailing protective paper strip against the take-up film-spool flanges to provide a light-tight protection for the exposed film.

Yet another object of the invention is the provision of a roll holder construction which facilitates the removal of an exposed film roll.

A still further object of the invention is the provision of a roll holder construction which is simple, inexpensive to manufacture, comprises few parts of rugged construction, and is extremely effective in use.

To these and other ends, the invention resides in certain improvements and combinations of parts, all as will be hereinafter more fully described, the novel features being pointed out in the claims at the end of the specification.

In the drawing.

Similar reference numerals throughout the various views indicate the same parts.

Figure 1:
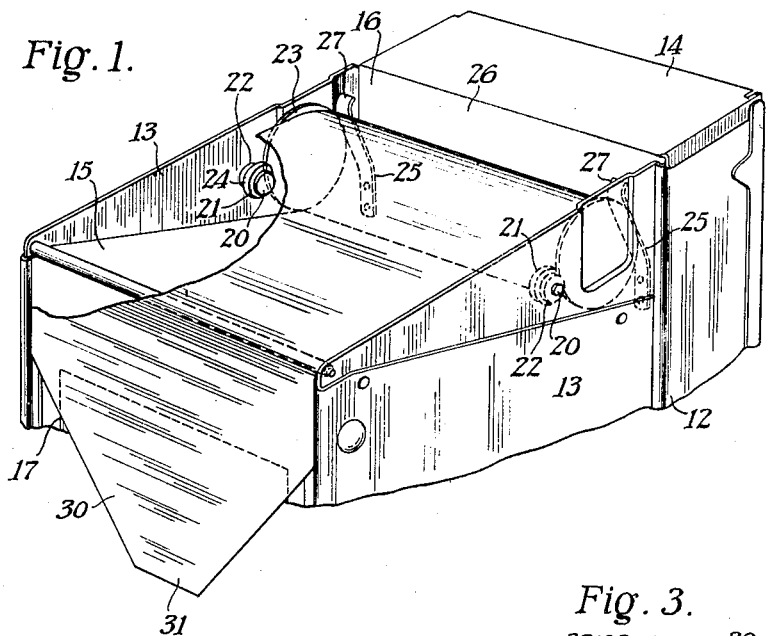
Fig. 1 is a perspective view of a portion of a photographic camera of the box type, showing the relation thereto of a roll holder arrangement constructed in accordance with the present invention.
Figure 2:
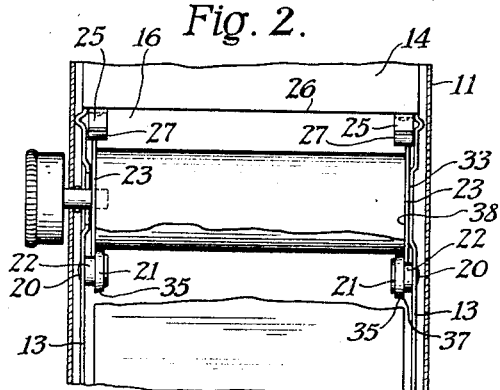
Fig. 2 is a top plan view of the film chamber and roll holder arrangement shown in Fig. 1, showing the relation of the improved spool supporting and tucking rollers of the present invention.

The present invention is shown as applied to a camera of the box type, but this is by way of illustration only and is not intended as a limitation as it is contemplated that the roll holder construction of the present invention is adapted for use with a wide variety of camera constructions.

The box camera of the present embodiment comprises an outer box-like shell or container 11 adapted to slidably receive, in telescoping relation, the inner film carrying member, generally indicated by the numeral 12. As this camera is of a standard and well-known construction, only so much thereof as relates to the present invention will be described.

The member 12 is formed with spaced side walls 13 which extend rearwardly of the lens and shutter carrying portion 14. The side walls 13 are connected by inclined plates or walls 15 which converge toward the lens and shutter, in the well-known manner. A camera of this general construction is shown in the patent to Stuber et al., No. 1,494,719, issued May 20, 1924, to which reference may be had for a more detailed construction of the various camera parts. The side walls 13 and the inclined walls 15 cooperate to form the film chambers 16, only one of which is shown. An exposure opening 17 is formed in the rear of the member 12 over which the film and paper strips are guided in the usual and well-known manner.

As each film chamber is identical in construction, only one is shown and will be described. A pair of aligned studs 20 are fixedly secured to the side walls 13 above the inclined walls 15, as clearly shown in Figs. 1 and 5. Each of these studs has mounted thereon a roller, generally indicated by the numeral 21 and formed with a hub portion 22 adapted to be engaged by one of the spool flanges 23, and a frusto conical portion 24 which is of a larger diameter than the portion 22 and positioned inside the flange 23, for purposes to be later described. A pair of springs 25 have the lower ends secured to the front walls 26 of the film chamber 16 while the upper ends 27 are adapted to engage the spool flanges 23 to yieldably retain the latter in engagement with the portions 22 of the rollers 21. When the camera is loaded, the unexposed or supply roll of film is positioned in the supply film chamber so that the spool flanges 23 rest between the springs 25 and the portions 22 of the rollers 21. In this position, the spool flanges 23 then also rest on the inclined bottom wall 15, all as shown in Fig. 5.

In the film threading operation, the protective backing paper strip is unwound from the supply film spool and is passed over the exposure aperture 17 and is then suitably secured to an empty film spool, not shown, positioned in the take-up film chamber, all of which is well known to those in the art. However, during this threading operation, the stored energy of the tightly wound supply film spool may tend to cause the film and backing paper to turn or clockspring relative to the film spool, the latter being held stationary by the springs 25 and the portions 22 of the rollers 21. This clockspringing will cause loosening of the film roll, the disadvantages of which will be readily apparent to those in the art. In order to prevent such undesirable clockspringing, the rollers 21 are so arranged that the frusto conical portions 24 thereof will be positioned inside the spool flanges so as to engage the outer convolutions of the leading paper strip of the supply roll to thus hold the paper strip to effectively prevent any clockspringing of the film and paper relative to the film spool. When, however, a few convolutions of paper strip are wound off, the portions 24 of the rollers 21 no longer engage the film spool. Thus, the portions 24 engage the film roll only when the latter is nearly full.

Figure 5:
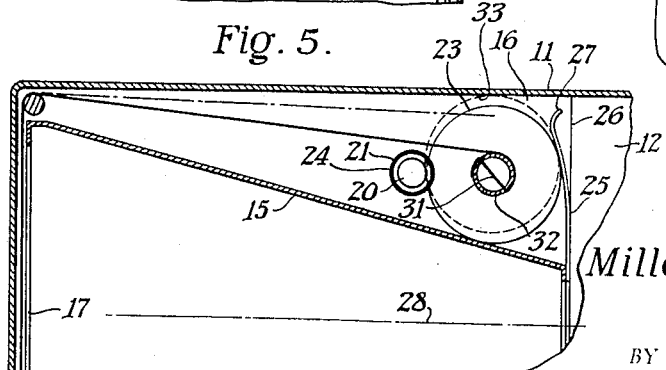
Fig. 5 is a vertical sectional view through one of the film chambers, showing the relation of the film spool and the rollers of the present invention.

The studs 20 and the rollers 21 have their centers positioned substantially in horizontal alignment with or only slightly above the axis of the film spool flanges so that a line drawn through the centers of the rollers 21 and the spool flanges 23 is substantially parallel to the lens axis, as indicated by the line 28, Fig. 5. When unwinding starts, the spool flanges 23 of the supply spool rest on the wall 15 and are positioned between the spring ends 27 and the portions 22 of the rollers 21, as shown in Fig. 5. The wall 15 and the spring ends 27 thus apply frictional force to the spool flanges during unwinding, that due to the spring ends 27 being, of course, constant. However, if the unwinding pull or resistance increases, the spool flanges 23 tend to roll in a counter-clockwise direction, as viewed in Fig. 5, around the portions 22 of the rollers 21 to slightly lift the flanges 23 away from the wall 15. The latter thus provides a variable frictional force which cooperates with the constant frictional force of the spring ends 27 to provide a substantially uniform resistance for pulling off the film and backing paper from the supply spool. The result is that the film and backing paper may be easily, steadily, and smoothly unwound or pulled off the supply spool.

Figure 3:
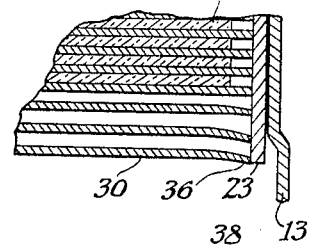
Fig. 3 is a sectional view of a portion of a roll of exposed film with its protective paper strip, as wound by roll holder constructions of the prior art.
Figure 4:
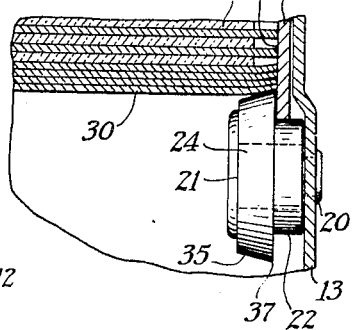
Fig. 4 is a view similar to Fig. 3, but showing the relation of the improved form of spool supporting roller to the film spool, and the arrangement by which the roller provides a tightly wound light-protected exposed film roll.

After the initial threading operation, the take-up spool 29, positioned in the take-up chamber, is rotated by a wind-up key, not shown, to wind up the leading paper strip onto the take-up spool until the first number on the backing paper appears before the red window at which time the first image area of the sensitized film is then in position for exposure. After each exposure, the take-up spool 29 is again rotated to wind up the exposed portion of the film thereon, all of which is well known to those in the art. After the final exposure is made, the trailing protective paper strip 30 is unwound off the supply spool and is wound up on the take-up spool 29 to provide a light-tight protection for the exposed film. As is well known, the trailing strip 30 has the end 31 thereof passed through a slot 32 in the hub of the supply spool, as shown in Fig. 5. An increased pull is required to disengage the trailing strip from the slot 32, and causes the supply film-spool flanges 23 to ride up further on the rollers 21 until the flanges finally engage the inner surface 33 of the outer casing 11, as shown in dotted lines in Fig. 5. Such engagement applies a braking force to the supply spool flanges so that the continued rotation of the take-up spool tightly draws down or snubs the trailing strip 30 onto the take-up spool to provide the desired tightly wound spool, as shown in Fig. 4. This tightly wound roll, Fig. 4, is to be compared with the more loosely wound roll, Fig. 3, secured from prior winding mechanisms.

The winding of the trailing strip 30 onto the take-up spool 29 finally brings the strip into engagement with the frusto conical portions 24 of the rollers 21 positioned in the take-up spool chamber. The tapered surfaces 35 of the portions 24, only one of which is shown in Fig. 4, serve to guide the marginal edges 36 of the trailing strip 30 towards the take-up spool flanges 23 and radially toward the spool center, as is apparent from an inspection of Fig. 4. The tapered surfaces 35 terminate in tucking edges or sections 37 which lie adjacent the inner surfaces 38 of the take-up spool flanges 23 and serve to radially bend or tuck in the marginal edges 36 tightly against the flanges 23 to provide a light-tight protection for the exposed film, as will be readily apparent from an inspection of Fig. 4. Thus a tightly wound roll is provided with the marginal edges of the trailing strip 30 forced or tucked tightly into place against the take-up spool flanges.

Referring now to Fig. 1, it is apparent that due to the small portions of the spool flanges 23 which are exposed, difficulty would be experienced in removing the exposed take-up spool from the take-up chamber by means of the spool flanges. It is also apparent, however, that due to the lack of any rods, rollers, or other obstructions extending across the take-up spool chamber in front of the take-up spool, the operator may readily and easily slide his hand downwardly along the wall 15 and under the full take-up spool to easily lift the latter out of the take-up spool chamber, thus facilitating the removal of the spool. Those having experience in removing full take-up spools from cameras of this type will readily appreciate the advantages of the present invention in relation to such spool removal.

The present invention thus provides a spool chamber or roll holder construction which effectively prevents clock springing of the film and backing paper on the supply spool during the threading operation, and also provides a tightly wound take-up spool with the marginal edges of the trailing paper strip tucked in against the spool flanges to afford the desired light-tight protection for the exposed film. In addition, such a roll holder construction provides a substantially uniform resistance for pulling off the supply spool, and facilitates the ready removal of the full take-up spool.

While one embodiment of the invention has been disclosed, it is to be understood that the inventive idea may be carried out a number of ways. This application is, therefore, not to be limited to the precise details described, but is intended to cover all variations and modifications thereof falling within the scope of the appended claims.

I claim:

1. In a photographic camera, the combination with a body formed with a film chamber adapted to receive a flanged film spool, of frusto-conical rollers each formed with a hub and mounted in said chamber on aligned axes extending transversely of said chamber and with the hubs of said rollers engaging the spool flanges and with the frusto-conical portions of said rollers adapted to engage the marginal edges of a trailing paper strip carried by said spool to tightly tuck said edges against said spool flanges.

2. In a photographic camera, the combination with a body formed with a film chamber adapted to receive a flanged film spool, of a pair of aligned rollers mounted on said body and positioned in said chamber, said rollers being formed with portions adapted to be engaged by the spool flanges, springs mounted in said chamber and engaging said spool flanges to yieldably retain the latter against said roller portions, and enlarged portions on said rollers positioned adjacent said spool flanges in a position to engage the marginal edges of a trailing paper strip carried by said spool to tightly tuck said edges against said flanges.

3. In a photographic comera, the combination with a body formed with a film chamber adapted to receive a flanged film spool, of a pair of aligned rollers mounted on said body and positioned in said chamber, said rollers being formed with portions adapted to be engaged by the spool flanges, springs mounted in said chamber and engaging said spool flanges to yieldably retain the latter against said roller portions, and a tapered larger portion on each of said rollers positioned adjacent the spool flanges in a position to engage the marginal edges of a trailing paper strip carried by said spool to guide said edges toward the center of said spool to tightly tuck said edges against the spool flanges.

4. In a photographic camera, the combination with a body formed with film chambers having side walls and adapted to receive flanged film spools, of a pair of fixed aligned studs mounted on said side walls, a roller loosely munted on each of said studs and formed with a portion of one diameter adapted to engage one of the spool flanges, a spring mounted in said chamber and engaging the spool flange to yieldably hold the latter against said portion, and a portion on each of said rollers of larger diameter formed with a tapered periphery with the larger section of said periphery positioned adjacent the spool flange to tuck a marginal edge of a trailing paper strip carried by said spool tightly against said flange and the remaining portion of said periphery serving to guide said edge radially toward the spool center and to said section.

5. In a photographic camera, the combination with a body formed with film chambers having side walls and adapted to receive flanged film spools, of a pair of fixed aligned studs mounted in said side walls, a roller loosely mounted on each of said studs and formed with a portion of one diameter adapted to engage one of the spool flanges, a spring mounted in said chamber and engaging the spool flange to yieldably hold the latter against said portion, and a portion on each of said rollers of larger diameter formed with a tucking edge positioned adjacent the spool flange and adapted to engage a marginal edge of a trailing paper strip carried by said spool to tightly tuck said marginal edge against said flange, and an inclined guide on said larger portion for guiding said marginal edge to said tucking edge.

6. In a photographic camera, the combination with a body formed with a take-up film chamber adapted to receive a flanged film spool, of frusto-conical rollers each formed with a hub and positioned in said chamber and having the hubs positioned to engage the flanges of said spools and the frusto-conical portions adapted to engage the marginal edges of a trailing paper strip carried by said spool to tightly tuck said edges against said spool flanges, said rollers and spool being mounted on a line which is substantially parallel to the axis of the camera lens.

MILLER R. HUTCHISON, Jr.